UNITED STATES PATENT OFFICE.

JOSEPH KEMPER, OF UTICA, NEW YORK.

PLASTIC COMPOSITION FOR BUILDING PURPOSES.

1,257,488. Specification of Letters Patent. Patented Feb. 26, 1918.

No Drawing. Application filed April 13, 1916. Serial No. 90,969.

*To all whom it may concern:*

Be it known that I, JOSEPH KEMPER, of Utica, in the county of Oneida and State of New York, have invented certain new and useful Improvements in Plastic Compositions for Building Purposes; and I do hereby declare that the following is a full, clear, and exact description thereof, which will enable others skilled in the art to which it appertains to make and use the same.

The purpose of my present invention is to provide a new and useful plastic composition to be used for building purposes in various ways.

A further purpose is to provide in such a composition a combination of which much the larger part is the waste product remaining after the production of acetylene gas from calcium carbid. In this way a composition is formed at very low cost, in that the larger part of its material is of very low cost or of no cost at all.

Another purpose of my invention is to provide a composition of matter from which may be made building blocks, bars, roofing tiles or other building units, which are strong, durable and fire-proof and adapted to be readily handled and worked upon in the construction of buildings.

Many of the building blocks or building units now used for various purposes such as blocks or bars for partition walls, roofing tiles and lining of refrigerators are commonly made either with all or the greater part of their material of relatively expensive substances such as Portland cement or plaster of Paris. My invention contemplates the formation of building units satisfactory for such purposes, but which shall be composed very largely of relatively cheap or inexpensive material. If such units may be formed of a composition, the larger part of which is cheap and the balance of the material of which is of no greater cost than heretofore, it will be obvious that a great saving will be effected and the blocks or other forms so manufactured will become available for more general use.

Where acetylene gas is produced on a commercial scale from calcium carbid and water, a calcareous by-product, heretofore a waste product, results, most of which is calcium hydroxid while the balance is composed of various impurities from the coke and limestone from which the calcium carbid was made, such as variable amounts of iron silicon compounds, silicon dioxid, magnesium hydrate, iron oxid and aluminum oxid. While the calcium hydroxid constitutes such a large part of the waste as to make the waste bear a resemblance in general appearance, chemical composition and consistency to slaked lime yet the said waste is a different material from and especially has not the virtue or cementitious qualities of commercial forms of slaked lime. The particular calcareous waste material I intend to utilize is indeed different from any other calcareous wastes that I know of in that it is formed from a different base, is formed in a different way and in a different form, contains some different and distinctive materials and has different characteristics from other calcareous wastes. This product when so produced is a liquid substance carrying about twenty-five to thirty per cent. of solid matter, which after sedimentation, draining and drying resembles slaked lime when dried. Heretofore no practical use for this waste product has been found, and in fact its disposition has been a matter of considerable expense. On account of its large proportion of solid matter when produced it cannot safely be emptied into ordinary sewer systems. It cannot safely be placed on dumping grounds, as its alkaline nature results in injury to horses walking therein. It will thus be seen that any way of utilizing this waste product will turn to profit what has heretofore been simply a source of expense and inconvenience.

This waste product I propose to use as the basis, body, or greater part of a composition suitable for building purposes in various ways. After the waste product mentioned as produced from acetylene gas plants has been sedimented, drained and dried, it is thoroughly pulverized and has mixed therewith a much smaller quantity of plaster of Paris and a still smaller quantity of Portland cement. The proportion of said materials is about as follows, although it will be obvious that considerable variations may be made without departing from the spirit of my invention: From six to ten parts of said waste product or waste calcium hydroxid, one part of Portland cement and from three to four parts of plaster of Paris. These materials are thoroughly mixed in the dry form and as so mixed may be stored for use at the factory or shipped for use elsewhere. The materials are then thoroughly mixed with sufficient water to produce the necessary plasticity to mold the composition into the desired blocks or forms or to otherwise apply it where desired. After the composition so formed has thoroughly dried at natural temperatures or by the use of artificial heat a building material results which is strong, durable, light in weight, cheap, fire-proof and substantially unaffected by water. The blocks or forms so produced are especially adapted for use as partition bars or blocks for the reason that the material is soft enough to have nails driven thereinto without difficulty and to be cut with a saw or other hand tools.

As nearly two-thirds by weight of the material used is the waste product mentioned or waste calcium hydroxid, it will be seen that the building composition produced by me may be made very economically. The economy effected, however, is really greater than at first appears for the reason that the specific gravity of said waste product when dry and pulverized is only about one-fifth that of Portland cement so that if in a given mixture one bushel of Portland cement were used, there would be used from about thirty to fifty bushels of said waste product or calcium hydroxid; in other words, the waste product forms by far the greater bulk of the completed composition. This lightness of the waste product also results in a very light weight building block or unit, resulting in economy in transportation and in labor in building and generally rendering the composition available where a heavier composition would not be usable. This lightness of weight in proportion to the strength of the finished product is particularly useful when the composition is used to form roofing tiles.

The strength and fire-resisting properties of the composition may be greatly increased by increasing the amount of pressure used when the composition is being formed into blocks or other building units.

Where a still lighter and more open texture is desired, as for instance in some forms of partition bars, a limited quantity of wood chips or other fibrous material may be added to the composition.

The plaster of Paris may in some cases be omitted when a harder product is desired, although the composition is not then adapted to be sawn or cut, but partakes more of the nature of stone, said composition being subjected to pressure in the mold when formed.

What I claim as new and desire to secure by Letters Patent is:

1. A plastic composition for building purposes composed of from six to ten parts of the calcareous waste left upon the production of acetylene gas from combining calcium carbid with water, one part of Portland cement and from three to four parts of plaster of Paris, thoroughly mixed with water sufficient to obtain the necessary plasticity to mold the composition into blocks or forms.

2. A plastic composition for building purposes composed of eight parts of the calcareous waste left upon the production of acetylene gas from combining calcium carbid with water, one part of Portland cement and from three to four parts of plaster of Paris, thoroughly mixed with water sufficient to obtain the necessary plasticity to mold the composition into blocks or forms.

In witness whereof I have affixed my signature, this 10th day of April, 1916.

JOSEPH KEMPER.

Copies of this patent may be obtained for five cents each, by addressing the "Commissioner of Patents, Washington, D. C."